(12) United States Patent
Watanabe et al.

(10) Patent No.: US 10,124,650 B2
(45) Date of Patent: Nov. 13, 2018

(54) AUTOMOBILE AIR CONDITIONER HOUSING HAVING A FRAME WITH SLOTS FOR DIFFERENT HEATERS

(71) Applicants: Sanden Holdings Corporation, Isesaki-shi, Gunma (JP); Keihin Corporation, Shinjuku-ku, Tokyo (JP)

(72) Inventors: Masao Watanabe, Isesaki (JP); Takahiro Seto, Tochigi (JP)

(73) Assignees: Sanden Holdings Corporation, Isesaki-shi, Gunma (JP); Keihin Corporation, Shinjuku-ku, Tokyo (JP)

( * ) Notice: Subject to any disclaimer, the term of this patent is extended or adjusted under 35 U.S.C. 154(b) by 0 days.

(21) Appl. No.: 15/121,821

(22) PCT Filed: Feb. 6, 2015

(86) PCT No.: PCT/JP2015/053418
§ 371 (c)(1),
(2) Date: Aug. 26, 2016

(87) PCT Pub. No.: WO2015/129434
PCT Pub. Date: Sep. 3, 2015

(65) Prior Publication Data
US 2017/0072771 A1    Mar. 16, 2017

(30) Foreign Application Priority Data
Feb. 26, 2014    (JP) .................................. 2014-035478

(51) Int. Cl.
*B60H 1/03*    (2006.01)
*B60H 1/00*    (2006.01)

(52) U.S. Cl.
CPC ......... *B60H 1/034* (2013.01); *B60H 1/00521* (2013.01); *B60H 2001/00128* (2013.01)

(58) Field of Classification Search
CPC ............................ B60H 1/00521; B60H 1/034
See application file for complete search history.

(56) References Cited

U.S. PATENT DOCUMENTS 3,641,744 A * 2/1972 Culbert .................. B01D 45/16
55/319
6,092,385 A * 7/2000 Yoshida ............. B60H 1/00521
62/272

(Continued)

FOREIGN PATENT DOCUMENTS

CN    102853514 A    1/2013
FR    2 849 806 A1    7/2004
(Continued)

OTHER PUBLICATIONS

Aloup et al., FR 2,849,806 A1 English machine translation, Jul. 16, 2004.*

(Continued)

*Primary Examiner* — Kenneth Rinehart
*Assistant Examiner* — Phillip E Decker
(74) *Attorney, Agent, or Firm* — Baker Botts L.L.P.

(57) ABSTRACT

An automobile air conditioner allows two types of heating devices for air heating (a heater core 14 and a PTC heater 15) to be selectively mounted therein.
A housing 2 of a HVAC unit 1 defines therein an air feed passage 3. Either of the heater core 14 and the PTC heater 15 is selectively mounted in the housing 2 through an insertion/ejection slot 32, which formed in a side surface the housing 2. The insertion/ejection slot 32 is formed so as to fit the heater core 14. The PTC heater 15 is housed in a frame 33 having an external dimension to fit into the insertion/ejection slot 32, and mounted in the housing 2 with the frame 33 interposed therebetween. The frame 33 has temperature sensor holders 34.

3 Claims, 14 Drawing Sheets

(56) References Cited

U.S. PATENT DOCUMENTS

| | | | | |
|---|---|---|---|---|
| 6,125,646 | A * | 10/2000 | Ebner | B60H 1/00521 165/178 |
| 7,828,224 | B2 * | 11/2010 | Yang | F24F 11/0012 454/258 |
| 2012/0325433 | A1 | 12/2012 | Hoppen et al. | |
| 2014/0000463 | A1 * | 1/2014 | Di Mauro | A47J 37/0731 99/445 |
| 2016/0361965 | A1 * | 12/2016 | Watanabe | B60H 1/00521 |

FOREIGN PATENT DOCUMENTS

| | | | | |
|---|---|---|---|---|
| FR | 2865966 A1 * | 8/2005 | | B60H 1/00521 |
| JP | H03-008014 U | 1/1991 | | |
| JP | 09-292196 A | 11/1997 | | |
| JP | 2000264043 A * | 9/2000 | | |
| JP | 2002-219929 A | 8/2002 | | |
| JP | 2008-155896 A | 7/2008 | | |
| JP | 2013-010500 A | 1/2013 | | |

OTHER PUBLICATIONS

The International Bureau of WIPO, International Preliminary Report on International Preliminary Report on Patentability issued for International Application No. PCT/JP2015/053418, dated Sep. 9, 2016.

The State Intellectual Property Office of the People's Republic of China, The First Office Action issue in Patent Application No. CN 201580010386.7, dated May 3, 2017.

Japan Patent Office, International Search Report issued in International Application No. PCT/JP2015/053418, dated May 12, 2015.

The State Intellectual Property Office of the People's Republic of China, The Third Office Action issued in Chinese Application No. CN 201580010386.7, dated Jun. 28, 2018.

Japan Patent Office, Notification of Reasons for Refusal issued in Japanese Patent Application No. JP 2014-035478, dated Dec. 26, 2017.

The State Intellectual Property Office of the People's Republic of China, The Second Office Action issued in Chinese Application No. CN 201580010386.7, dated Nov. 28, 2017.

* cited by examiner

AUTOMOBILE AIR CONDITIONER HOUSING HAVING A FRAME WITH SLOTS FOR DIFFERENT HEATERS

CROSS-REFERENCE TO RELATED APPLICATIONS

This application is a U.S. National Stage Patent Application under 37 U.S.C. § 371 of International Patent Application No. PCT/JP2015/053418, filed on Feb. 6, 2015, which claims the benefit of Japanese Patent Application No. JP 2014-035478, filed on Feb. 26, 2014, the disclosures of each of which are incorporated herein by reference in their entirety.

TECHNICAL FIELD

The present invention relates to an automobile air conditioner including a heating device (heating means) which is provided in an air feed passage formed in a housing and which is selected from two types of heating devices differing in shape and size.

BACKGROUND ART

An automobile air conditioner of heat pump system, which is employable in an engine-driven automobile, an electric automobile and a hybrid vehicle, includes an air-cooling heat exchanger (evaporator) and an air-heating heat exchanger (condenser).

The automobile air conditioner of heat pump system uses the condenser as a heating device during air heating operation. However, this might cause the air conditioner to fail to provide sufficient air heating performance at extremely low temperature. To address this, it is desirable that the air conditioner should additionally use, as an auxiliary heating device, a heater core, which is a heat exchanger using, as a heating medium, the engine cooling water, when employed in the engine-driven automobile, or an electric heater when employed in the electric automobile.

However, the heater core and the electric heater are different in shape and size, so that different air conditioner housings have to be prepared for the engine-driven automobile and for the electric automobile.

Patent Document 1 discloses a method for making it possible to select the size or number of the heater cores in the housing. In this method, small heater cores or a single heater core, if employed, is mounted in the housing after housed in a frame body. However, Patent Document 1 does not disclose any method for selectively mounting two types of heating devices such as a heater core and an electric heater.

REFERENCE DOCUMENT LIST

Patent Document

Patent Document 1: Japanese Patent Application Laid-open Publication No. 2002-219929

SUMMARY OF THE INVENTION

Problems to be Solved by the Invention

The present invention has been made in view of the aforementioned circumstances, and an object of the present invention is to provide the automobile air conditioner that allows two types of heating devices differing in shape and size, such as a heater core and an electric heater, to be selectively mounted in a common housing.

Means for Solving the Problems

The automobile air conditioner according to the present invention includes a heating device which is provided in an air feed passage formed in a housing, and which is selected from two types of heating devices differing in shape and size. The selected heating device is mounted in the housing by being inserted thereto through an insertion/ejection slot formed in an outer surface of the housing.

The insertion/ejection slot is formed so as to fit the larger one of the two types of heating devices.

When selected, the smaller one of the two types of heating devices is housed in a frame having an external dimension to fit into the insertion/ejection slot, and is mounted in the housing with the frame interposed therebetween.

The larger side of the two types of heating devices is, for example, a heater core using, as a heating medium, engine cooling water, and the smaller one of the two types of heating devices is, for example, an electric heater.

When the electric heater is housed in a frame having an external dimension to fit into the insertion/ejection slot and is mounted in the housing with the frame interposed therebetween, the frame may preferably have a temperature sensor holder.

Effects of the Invention

The present invention allows two heating devices of different types, such as the heater core and the electric heater, to be mounted in the common housing, thus contributing to cost reduction through commonization of parts.

In addition, according to the present invention, the temperature sensor holder may be provided in the frame when the electric heater is employed. This facilitates the attachment of the temperature sensor necessary for the control of the electric heater and for the protection of the housing.

MODES FOR CARRYING OUT THE INVENTION

Hereinafter, embodiments of the present invention will be described in detail.

Figure 13:
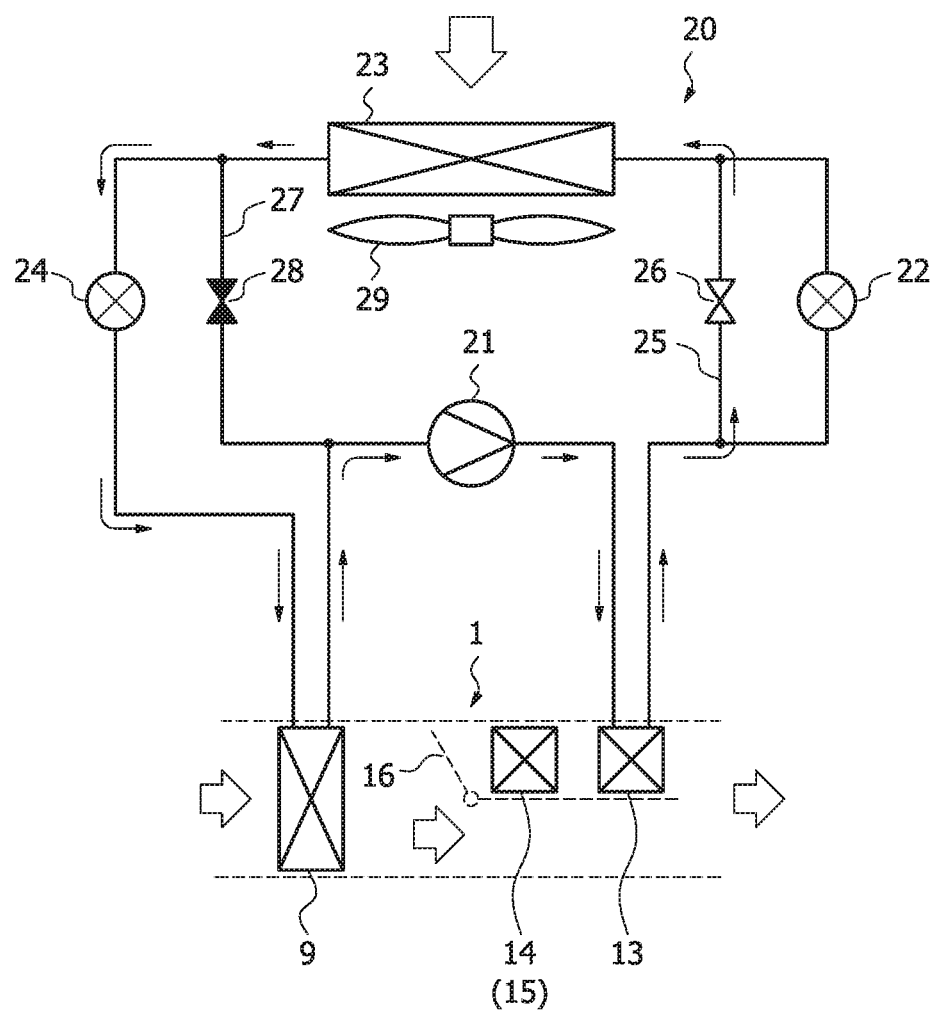
FIG. 13 is a schematic view of a heat pump cycle during air cooling operation.
Figure 14:
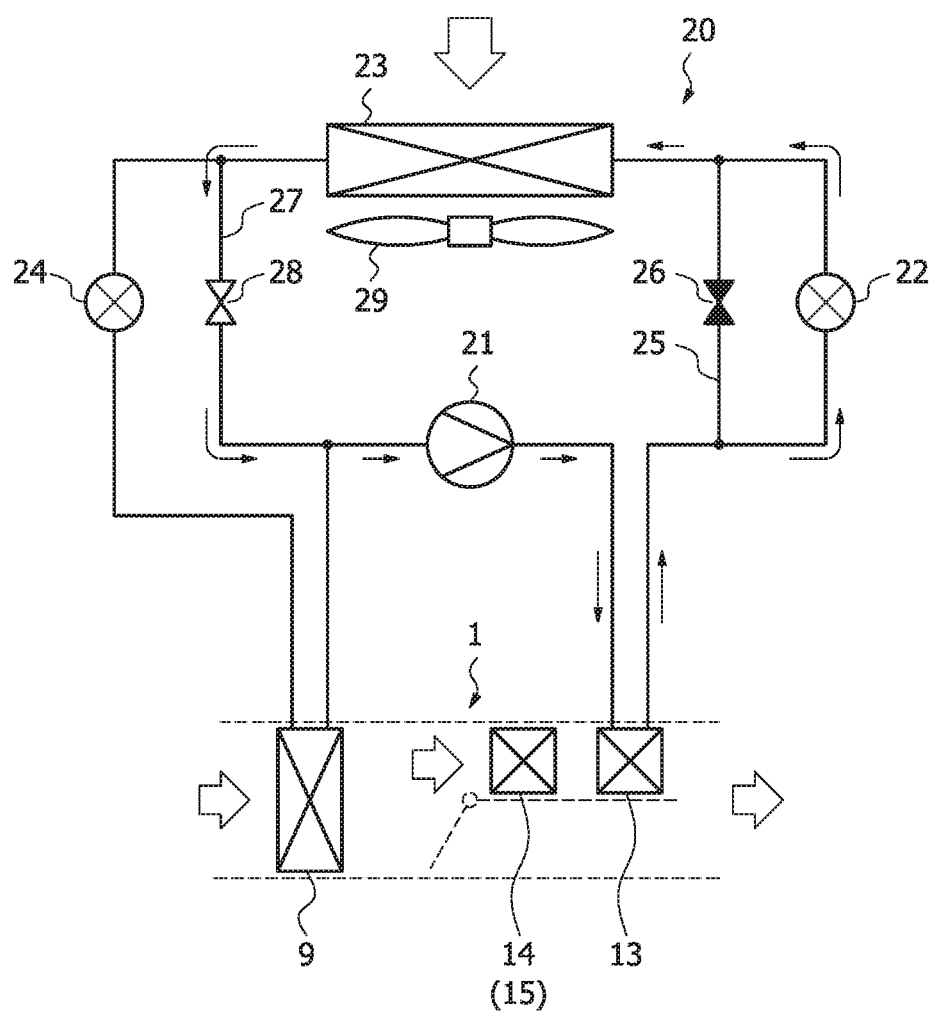
FIG. 14 is a schematic view of the heat pump cycle during air heating operation.

An automobile air conditioner according to an embodiment, which is provided to an automobile (such as an engine-driven automobile, an electric automobile and a hybrid vehicle), includes a heating ventilation and air conditioning (HVAC) unit 1 (FIGS. 1 to 6) and a heat pump cycle 20 (FIGS. 13 and 14). The HVAC unit 1 is disposed in the interior of the automobile, and configured to adjust the temperature of air taken in from the interior of the automobile (inside air) or from outside the automobile (outside air) and then to blow out the air to the interior of the automobile. The heat pump cycle 20 is disposed in the exterior of the automobile, and configured to exchange heat between the air taken in the HVAC unit 1 and a fluorocarbon refrigerant.

Figure 1:
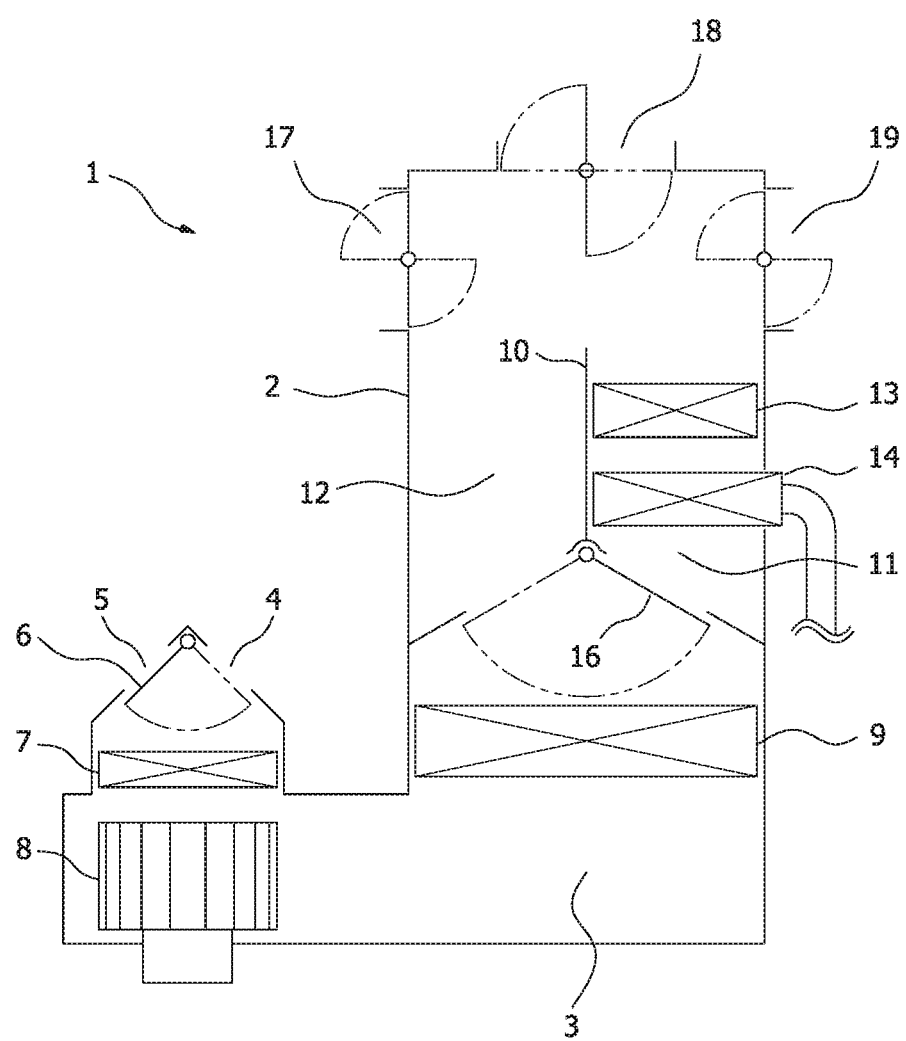
FIG. 1 shows a schematic configuration of an air conditioner of heater core type according to an embodiment of the present invention.
Figure 2:
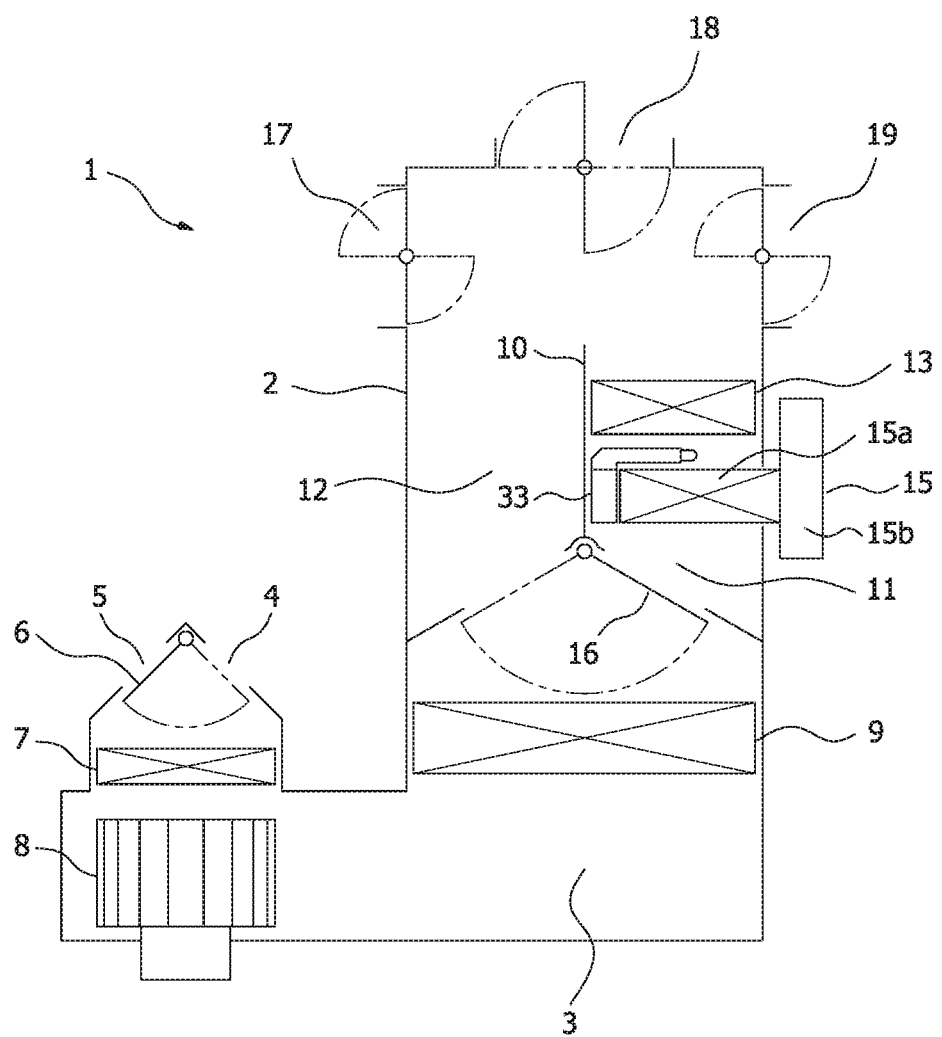
FIG. 2 shows a schematic configuration of an air conditioner of PTC heater type.
Figure 3:
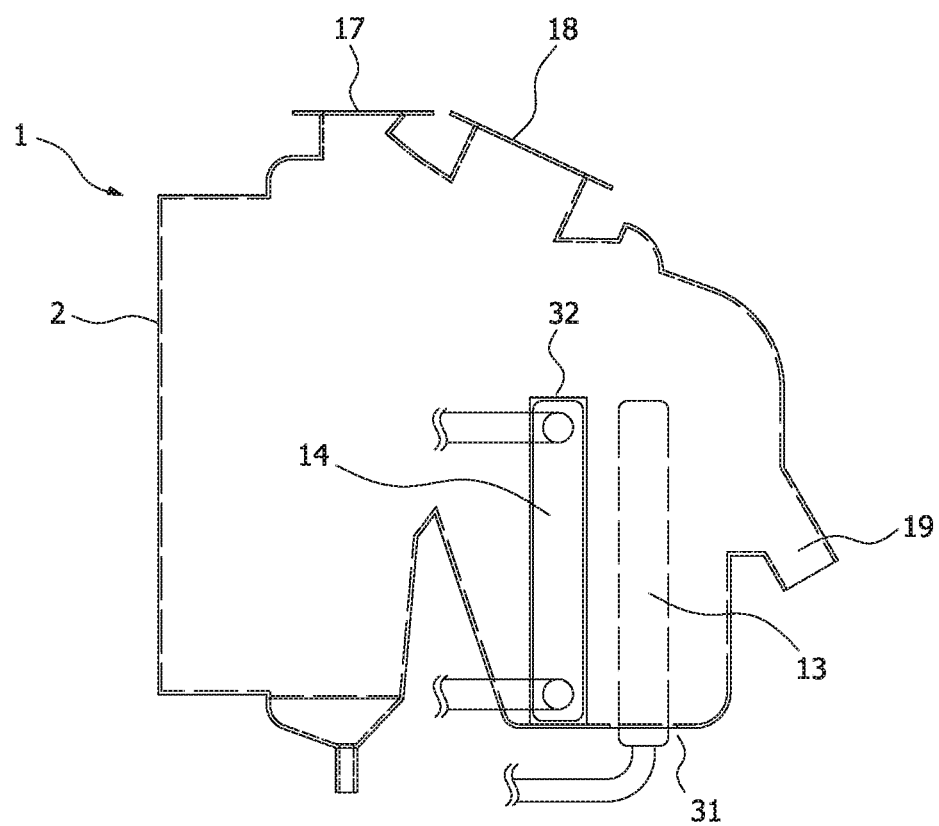
FIG. 3 is a side view of the air conditioner of heater core type.
Figure 4:
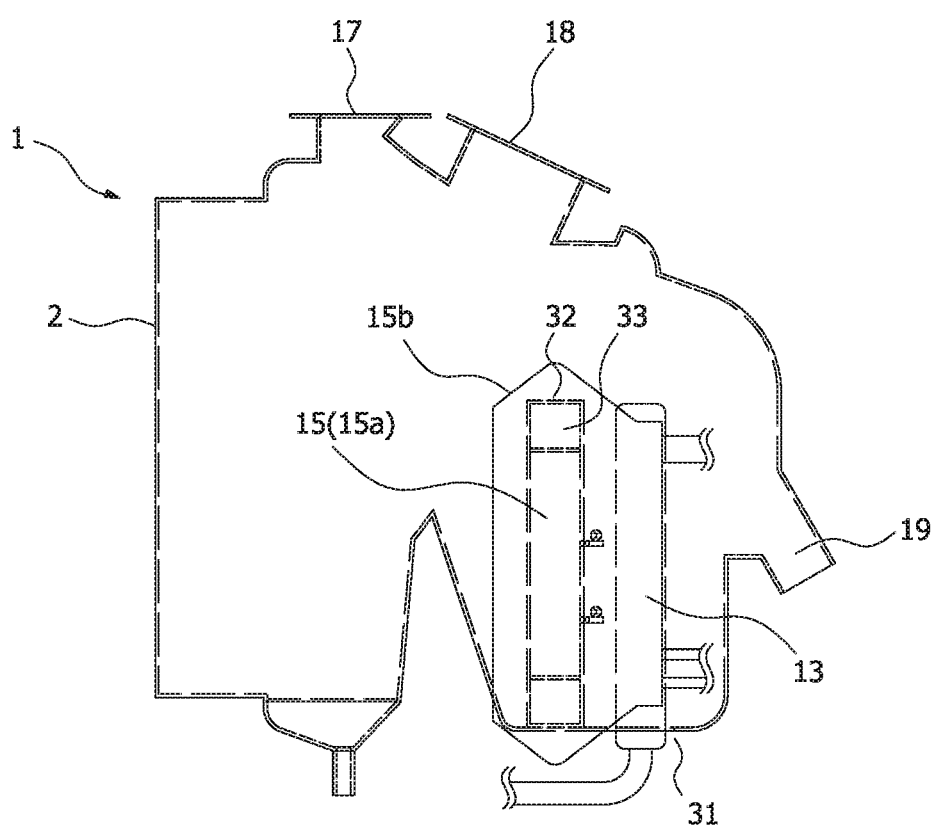
FIG. 4 is a side view of the air conditioner of PTC heater type.
Figure 5:
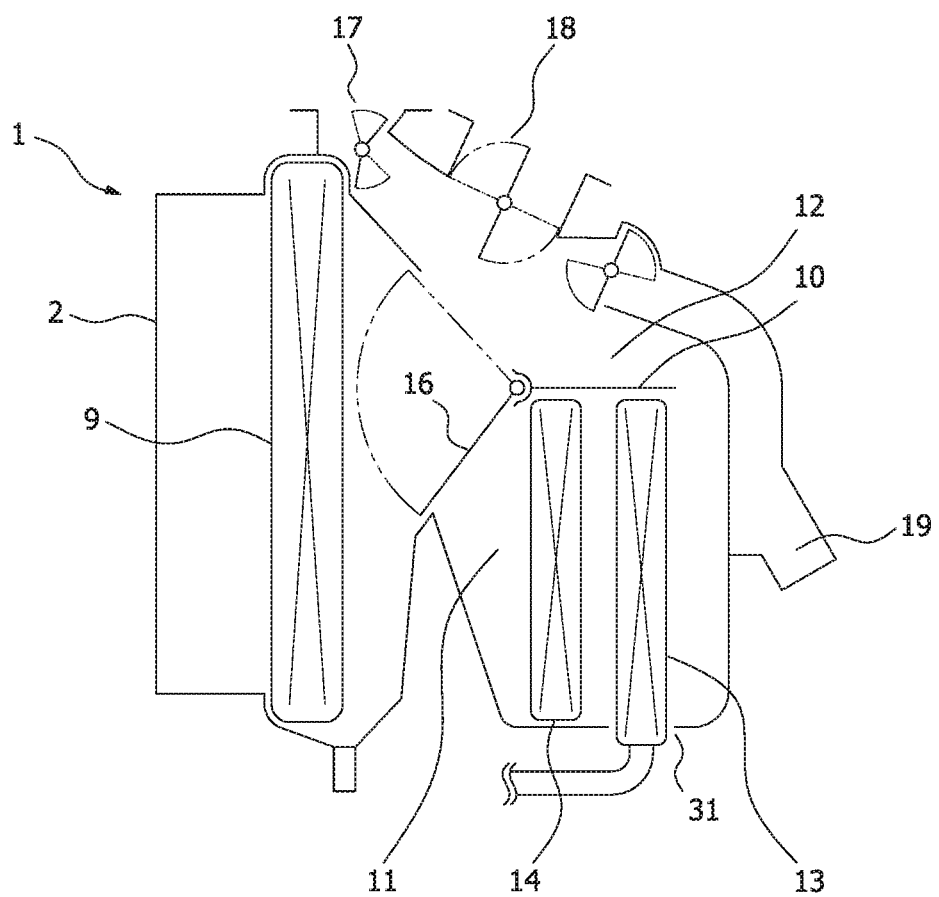
FIG. 5 is a cross-sectional view of the air conditioner of heater core type.
Figure 6:
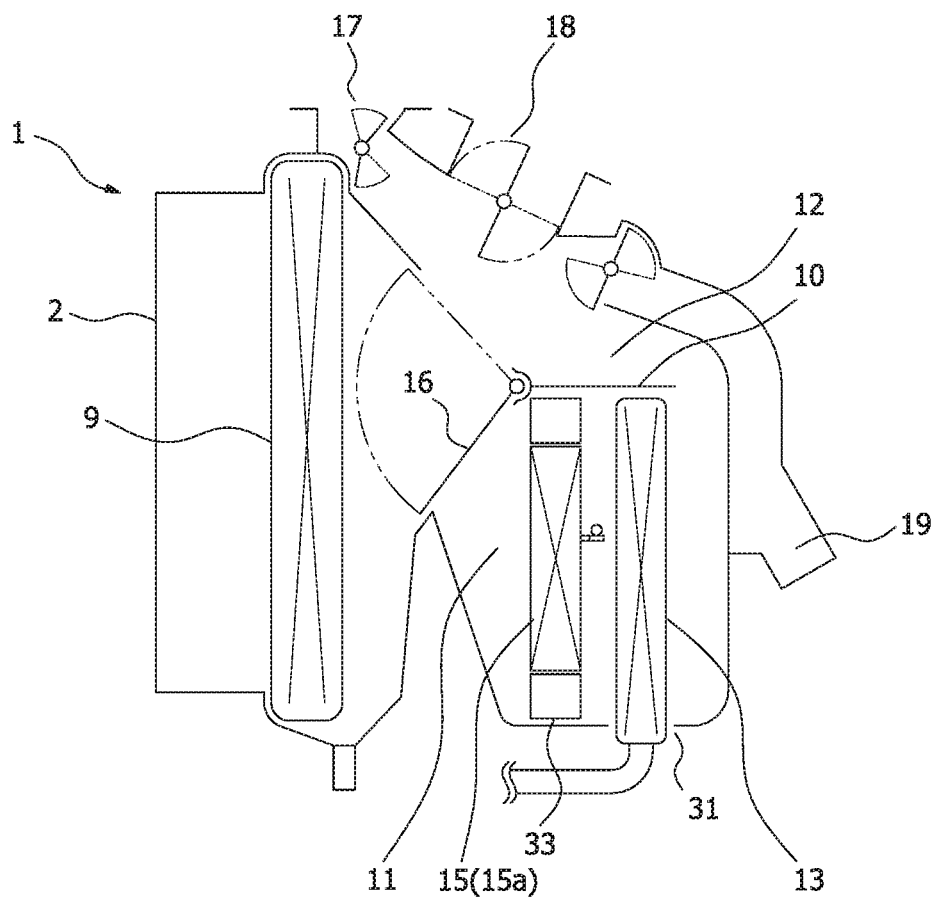
FIG. 6 is a cross-sectional view of the air conditioner of PTC heater type.

FIGS. 1 and 2 are each a schematic diagram of the HVAC unit 1. FIG. 1 shows a heater core type while FIG. 2 shows a PTC heater type. FIGS. 3 and 4 are each a side view of the HVAC unit 1. FIG. 3 shows the heater core type while FIG. 4 shows the PTC heater type. FIGS. 5 and 6 are each a cross-sectional view of the HVAC unit 1. FIG. 5 shows the heater core type while FIG. 6 shows the PTC heater type.

The automobile air conditioner according to this embodiment uses, as a heating device for air heating, a condenser 13 for heat pump cycle, and uses, as an auxiliary heating device, a heater core 14 or a PTC heater 15. Note thus that the terms "heater core type" and "PTC heater type" used herein refer to systems using, as the auxiliary heating device, the heater core 14 and the PTC heater 15, respectively.

Hereinafter, the configuration of the HVAC unit 1 will be described with reference mainly to FIGS. 1 and 2.

The HVAC unit 1 includes a housing 2 which defines therein an air feed passage 3.

At the inlet of the air feed passage 3, an inside-air intake port 4, an outside-air intake port 5, an inside-air/outside-air switching door 6, a filter 7 and a blower 8 are provided. The inside-air/outside-air switching door 6 allows selective switching between the intake ports 4 and 5. The blower 8 takes in air (inside or outside air) through either of the intake ports 4 and 5 and feeds the air to the air feed passage 3.

In the air feed passage 3, an evaporator 9 is provided downstream of the blower 8. The evaporator 9 is an air-cooling heat exchanger for heat pump cycle.

A partition wall 10 separates the portion, downstream of the evaporator 9, of the air feed passage 3 into an air-heating heat-exchange passage 11 and a bypass passage 12.

In the air-heating heat-exchange passage 11, heating devices, that is, the condenser 13 and either of the heater core 14 and the PTC heater 15, are provided in series. Specifically, the heater core 14 or the PTC heater 15 is provided upstream of the condenser 13, which is an air-heating heat exchanger for heat pump cycle.

Thus, the bypass passage 12 allows the bypass of these two heating devices (the condenser 13 and either of the heater core 14 and the PTC heater 15).

The heater core 14, which is an auxiliary heating device suitable for engine-driven automobiles, is configured to heat air using, as a heating medium, the engine cooling water (engine cooling water having absorbed heat by cooling the engine).

On the other hand, the PTC heater 15, which is an auxiliary heating device suitable for electric automobiles, is configured to heat air by causing the air to pass across the heater element that is electrically heated. Employing a positive temperature coefficient (PTC) heater as an electric heater facilitates temperature control.

At the inlets of the air-heating heat-exchange passage 11 and the bypass passage 12, an air-mix door 16 is provided. The air-mix door 16 allows control of the air flow into the air-heating heat-exchange passage 11 (air flow to the two heating devices). During air cooling operation, the air-mix door 16 can block air from flowing in the air-heating heat-exchange passage 11.

At the outlet of the air feed passage 3, a defroster air outlet 17, a face air outlet 18 and a foot air outlet 19, each of which is opened and closed by the dedicated door, are provided so as to allow temperature-adjusted air to be blown out in an appropriate direction.

Note that, when configured as a right and left independent temperature control air conditioner, which is capable of independently controlling the driver-side temperature and the passenger-side temperature, the automobile air conditioner includes right and left independent air feed passages 3 and 3. The air feed passages 3 and 3 are disposed on the opposite sides that correspond to the near and far sides in the direction perpendicular to the planes of FIGS. 1 to 6.

The air-cooling heat exchanger 9 and the air-heating heat exchangers 13 and 14 (or 15) are provided to span both the right and left independent air feed passages 3 and 3.

On the other hand, the air-mix doors 16 are provided one-to-one to the right and left independent air feed passages 3 and 3. Individually controlling the openings sizes of the air-mix doors 16 allows for the right and left independent temperature control.

In addition, the face air outlets 18 and the foot air outlets 19 are also right and left independently provided, though obvious.

Hereinafter, the configuration of the heat pump cycle 20 will be described with reference to FIGS. 13 and 14. FIG. 13 is a schematic diagram of the heat pump cycle 20 during air cooling operation. FIG. 14 is a schematic view of the heat pump cycle 20 during air heating operation.

The heat pump cycle 20, which is a refrigerant cycle device using a fluorocarbon refrigerant, includes the evaporator (air-cooling heat exchanger) 9 and the condenser (air-heating heat exchanger) 13.

Specifically, the heat pump cycle 20 includes the evaporator (air-cooling heat exchanger) 9, a compressor 21, the condenser (air-heating heat exchanger) 13, decompression means 22 such as an expansion valve, a vehicle-exterior heat exchanger 23 and decompression means 24 such as an expansion valve. The compressor 21 is coupled to an outlet-side pipe of the evaporator 9. The condenser 13 is coupled to an outlet-side pipe of the compressor 21. The decompression means 22 is coupled to an outlet-side pipe of the condenser 13. The vehicle-exterior heat exchanger 23 is coupled to an outlet-side pipe of the decompression means 22. The decompression means 24 is coupled to an outlet-side pipe of the vehicle-exterior heat exchanger 23. The evaporator 9 is coupled to an outlet-side pipe of the decompression means 24.

The vehicle-exterior heat exchanger 23 is disposed in the exterior of the automobile, specifically, on the front face of the automobile. Receiving wind generated by a fan 29 or wind generated by the automobile movement, the vehicle-exterior heat exchanger 23 exchanges heat between the refrigerant therein and outside air.

To allow the bypass of the decompression means 22, a bypass pipe 25 with an on-off valve 26 is provided. Devices including the on-off valve 26 are controlled so as to cause the refrigerant to flow through the bypass pipe 25 during air cooling operation, but through the decompression means 22 during air heating operation.

In addition, to allow the bypass of the decompression means 24 and the evaporator (air-cooling heat exchanger) 9, a bypass pipe 27 with an on-off valve 28 is provided. Devices including the on-off valve 28 are controlled so as to cause the refrigerant to flow through the decompression means 24 and the evaporator 9 during air cooling operation, but through the bypass pipe 27 during air heating operation.

Note that, though not described herein, the aforementioned devices for controlling the flows also include appropriately disposed devices such as one-way valves, in addition to the on-off valves 26 and 28.

Next, description will be given of the operations of the heat pump cycle 20 during air cooling operation and during air heating operation.

During air cooling operation, the on-off valve 26 of the bypass pipe 25 is opened and the on-off valve 28 of the bypass pipe 27 is closed as shown in FIG. 13, so that the refrigerant is cycled in the direction indicated by arrows of FIG. 13.

In the heat pump cycle 20, the refrigerant is first compressed by the compressor 21, and the resultant high-temperature, high-pressure gaseous refrigerant flows in the condenser (air-heating heat exchanger) 13. However, the air-mix door 16 is closed during air cooling operation. Accordingly, the refrigerant compressed by the compressor 21 passes through the condenser 13 without condensed by heat exchange with air, and flows through the bypass pipe 25 into the vehicle-exterior heat exchanger 23 while remaining in high-temperature, high-pressure gaseous state. Here, the vehicle-exterior heat exchanger 23 functions as a condenser during air cooling operation. Then, in the vehicle-exterior heat exchanger 23, the high-temperature, high-pressure gaseous refrigerant is liquefied by condensation while releasing heat into outside air.

Note that the heat pump cycle 20 can be manufactured at lower cost than a system that causes the refrigerant to bypass the condenser (air-heating heat exchanger) 13 during air cooling operation, since the latter system requires any pipe and valve for bypassing the condenser 13 but the heat pump cycle 20 requires no such pipe or valve.

The refrigerant condensed in the vehicle-exterior heat exchanger 23 is adiabatically expanded and decompressed in the decompression means 24 such as the expansion valve. Then, the resultant gas-liquid two-phase refrigerant flows into the evaporator (air-cooling heat exchanger) 9. In the evaporator 9, the refrigerant is heated and vaporized by heat exchange with air. The air thus cooled in the evaporator 9 is blown out through one or more appropriate ones of the air outlets so as to cool the interior air of the automobile.

The gaseous refrigerant having passed through the evaporator 9 is sucked by the compressor 21 and recompressed therein.

During air heating operation, the on-off valve 26 of the bypass pipe 25 is closed and the on-off valve 28 of the bypass pipe 27 is opened as shown in FIG. 14, so that the refrigerant is cycled in the direction indicated by arrows of FIG. 14.

In the heat pump cycle 20, the refrigerant is first compressed by the compressor 21, and the resultant high-temperature, high-pressure gaseous refrigerant flows in the condenser (air-heating heat exchanger) 13. In the condenser 13, the refrigerant is cooled and liquefied through condensation by heat exchange with air. The air thus heated in the condenser 13 is blown out through one or more appropriate ones of the air outlets so as to heat the interior air of the automobile.

The refrigerant condensed in the condenser 13 is adiabatically expanded and decompressed in the decompression means 22 such as the expansion valve. Then, the resultant gas-liquid two-phase refrigerant flows into the vehicle-exterior heat exchanger 23. Here, the vehicle-exterior heat exchanger 23 functions as an evaporator during air heating operation. Then, in the vehicle-exterior heat exchanger 23, which receives wind generated by the fan 29 or wind generated by the automobile movement, the gas-liquid two-phase refrigerant is vaporized by absorbing heat from outside air. Then, the gaseous refrigerant passes through the bypass pipe 27 to be sucked by the compressor 21 and recompressed therein.

Typically, an air conditioner employing the heat pump cycle 20 configured as described above uses the condenser 13 as a heating device during air heating operation. This might cause such an air conditioner to fail to provide sufficient air heating performance at extremely low temperature. To address this, the air conditioner according to this embodiment additionally uses, as an auxiliary heating device, the heater core 14 when employed in an engine-driven automobile, or the PTC heater 15 when employed in an electric automobile.

However, providing two heating devices for air heating, that is, the condenser 13 and either of the heater core 14 and the PTC heater 15, increases the size of the air conditioner accordingly. Thus, these heating devices have to be disposed as close to each other as possible.

In light of the above, in this embodiment, the two heating devices 13 and 14 (or 15) are mounted in the following way.

Figure 7:
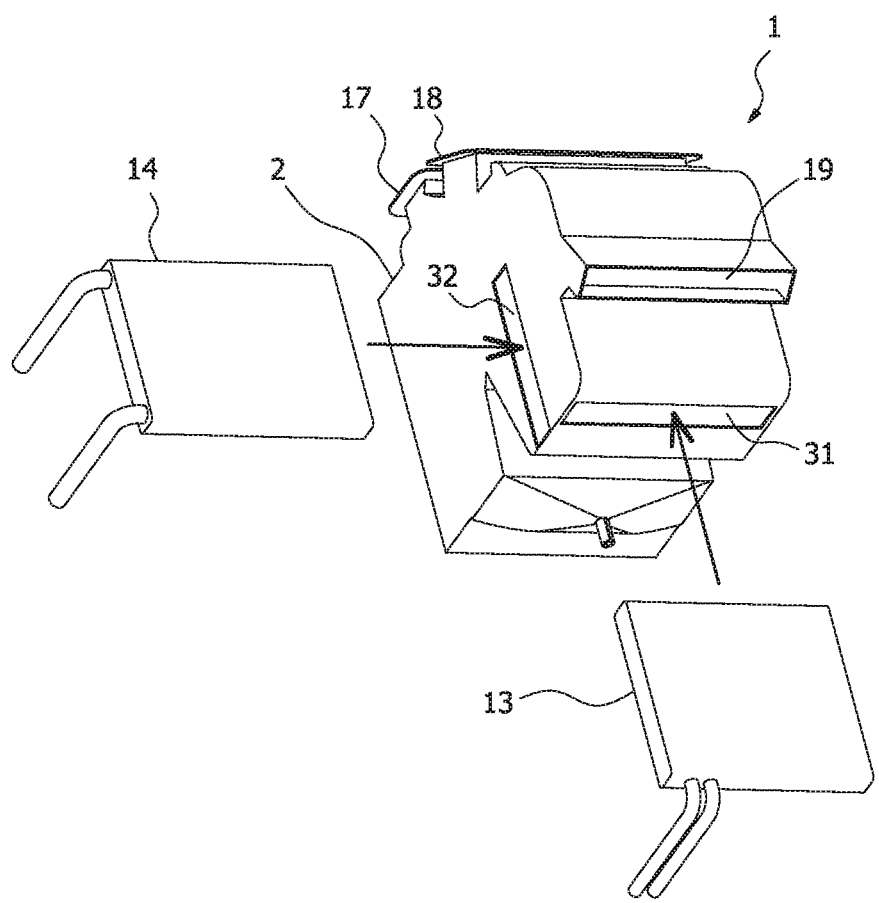
FIG. 7 is a perspective view illustrating how to assemble the air conditioner of heater core type.
Figure 8:
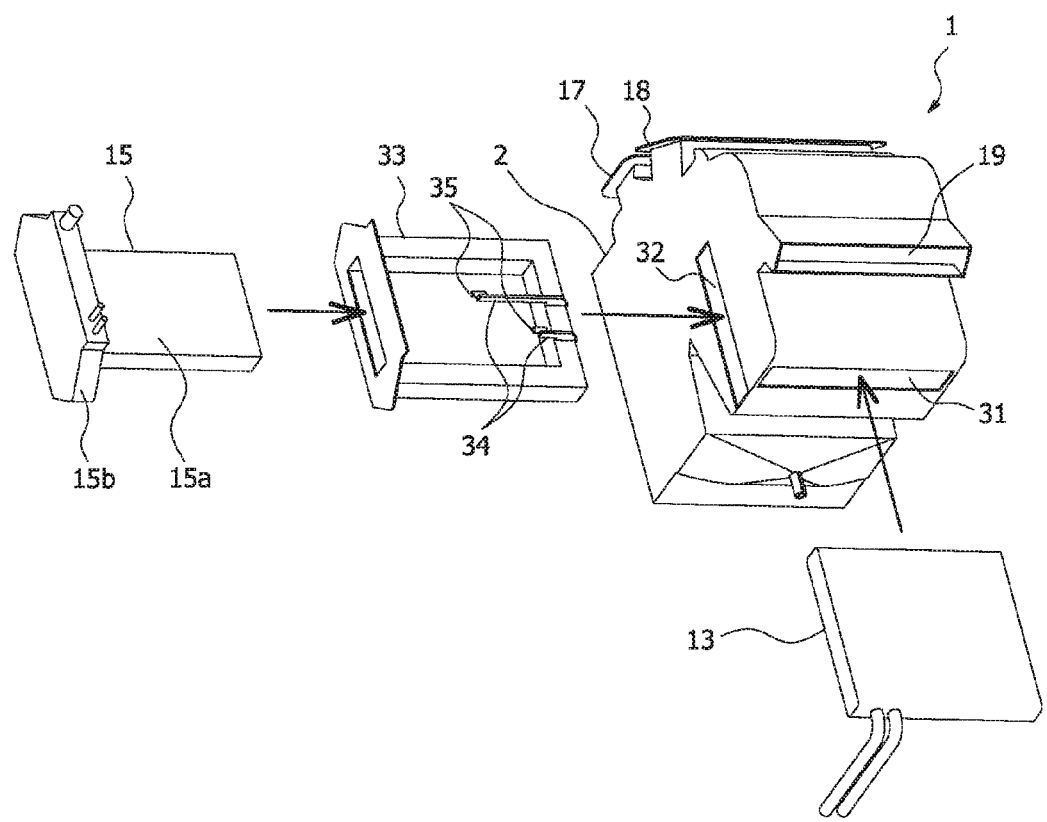
FIG. 8 is a perspective view illustrating how to assemble the air conditioner of PTC heater type.

FIGS. 7 and 8 are each a perspective view illustrating how to assemble the HVAC unit 1. FIG. 7 shows the heater core type while FIG. 8 shows the PTC heater type.

In outer surfaces of the housing 2, two insertion/ejection slots 31 and 32 are formed, and the two heating devices 13 and 14 (or 15) are mounted in the housing 2 by being inserted thereto through these insertion/ejection slots 31 and 32, respectively.

Here, the surface in which the insertion/ejection slot 31 is formed is different from the surface in which the insertion/ejection slot 32 is formed. Accordingly, the two heating devices 13 and 14 (or 15) are mounted in the housing 2 by being inserted thereto in mutually different directions.

More specifically, the insertion/ejection slot 31 for the condenser 13 is formed in the lower surface of the housing 2, and the condenser 13 is mounted in the housing 2 by being inserted thereto from below.

On the other hand, the insertion/ejection slot 32 for the heater core 14 (or the PTC heater 15) is formed in a side surface of the housing 2, and the heater core 14 (or the PTC heater 15) is mounted in the housing 2 by being inserted thereto from the side.

The configuration in which the two heating devices 13 and 14 (or 15) are mounted in the housing 2 by being inserted thereto from different directions prevents interference between portions, exposed outside the housing 2, of the two heating devices 13 and 14 (or 15).

Specifically, each of the insertion-type heating devices 13 and 14 (or 15) has a flange portion, which works as a sealing member when locked to the inner periphery of the corresponding one of the insertion/ejection slots 31 and 32. The flange portions prevent air leakage through the insertion/ejection slots 31 and 32. Thus, if another configuration were employed in which these two heating devices were inserted into the same surface in the same direction as each other, the heating devices would have to be disposed apart from each other to avoid interference between the flange portions thereof.

In contrast, inserting the heating devices into different surfaces in different directions allows the heating devices to be disposed closer while avoiding interference between the flange portions.

When the PTC heater 15 is used as an auxiliary heating device, the PTC heater 15 typically includes a heater element 15a to be housed in the housing 2 and a control unit 15b which is to protrude outside the housing 2 and which is larger in the air feed passage direction than the heater element 15a. Thus, if the configuration were employed in which these two heating devices were inserted into the same surface in the same direction as each other, the heating devices would have to be disposed apart from each other to avoid interference between the control unit 15b and the other heating device (condenser) 13.

In contrast, inserting the heating devices into different surfaces in different directions allows the heating devices to be disposed closer while avoiding interference by the control unit 15b.

Therefore, this embodiment provides an effect of preventing an increase in size of the HVAC unit 1 by allowing the two heating devices to be disposed close to each other in the air feed passage direction (vehicle front-back direction).

Note that, though it is conceivable that the two heating devices can be mounted by being inserted into the opposite side surfaces, the two heating devices should be inserted from below and from a side. This is because link mechanisms for operating various doors are disposed on one of the opposite side surfaces, and would interfere with the heating device displaced on the same side surface.

As described above, the automobile air conditioner of heat pump type additionally uses, as an auxiliary heating device, the heater core 14 when employed in an engine-driven automobile, or the PTC heater 15 when employed in an electric automobile.

However, the shape and size differences between the heater core 14 and the PTC heater 15 require a creative design for the communization of the housing 2.

To address this challenge, this embodiment makes it possible to selectively mount the heater core 14 and the PTC heater 15 in the following way.

The portion housed in the housing 2 of the heater core 14 is larger than the portion housed in the housing 2 of the PTC heater 15.

The insertion/ejection slot 32, through which either of the heater core 14 and the PTC heater 15 is selectively mounted, is formed so as to fit the heater core 14, which is the larger of the two.

Thus, when employed, the heater core 14 is mounted by being inserted directly through the insertion/ejection slot 32 as shown in FIG. 7.

On the other hand, when employed, the PTC heater 15, which is the smaller of the two, is mounted as follows.

As shown in FIG. 8, the PTC heater 15 (heater element 15a) is housed in a frame 33 having external dimensions to fit into the insertion/ejection slot 32, and mounted in the housing 2 with the frame 33 interposed therebetween.

The frame 33 is formed of a heat resistant resin and has a channel shape (U shape). The frame 33 has holders 34 and is inserted with temperature sensors 35 held by the holders 34 as will be described later.

This configuration allows two heating devices of different types, such as the heater core 14 and the PTC heater 15, to be mounted in the common housing 2, thus contributing to cost reduction through commonization of parts.

Specifically, the frame 33 for mounting the PTC heater 15 may be structured as follows.

Figure 9:
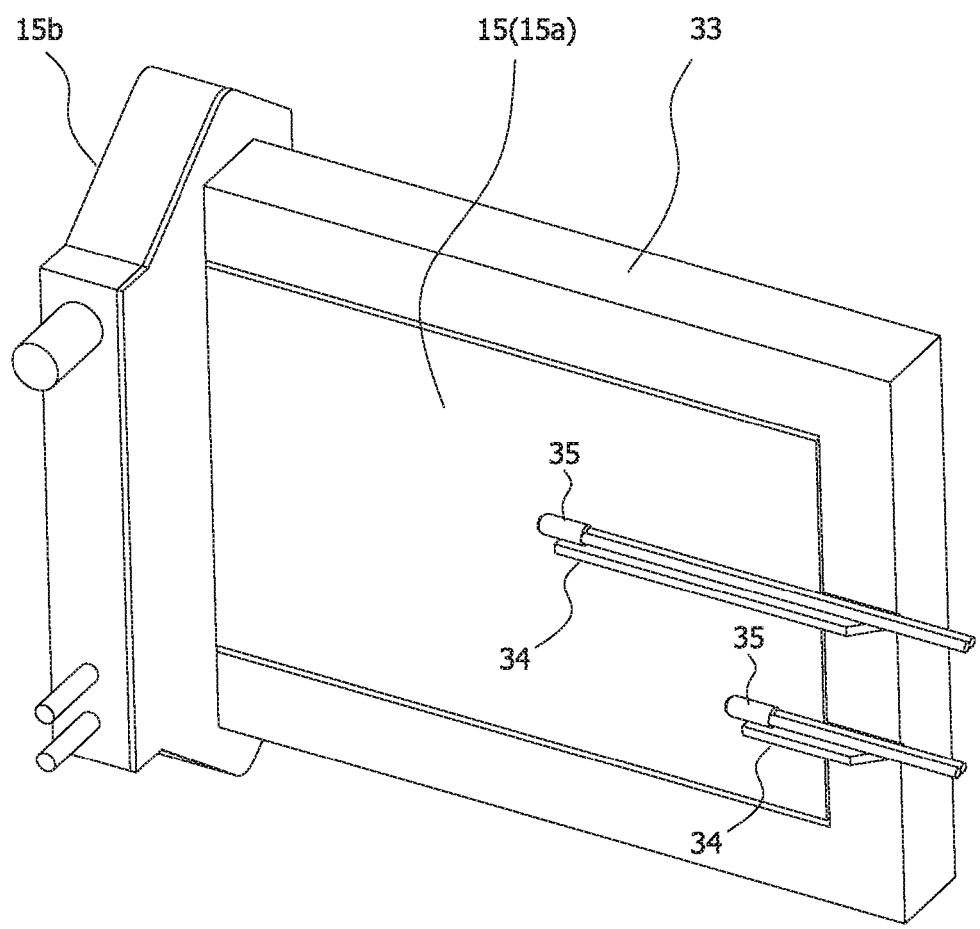
FIG. 9 is a perspective view of a frame for mounting a PTC heater.
Figure 10:
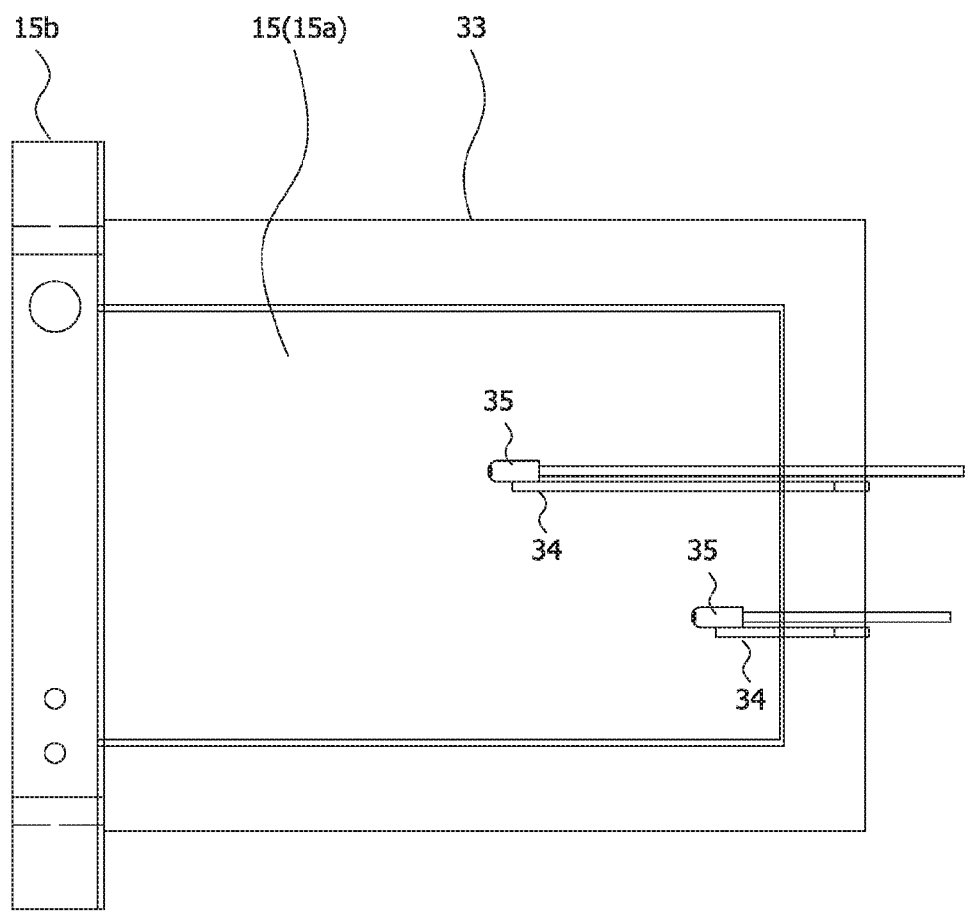
FIG. 10 is a front view of the frame.
Figure 11:
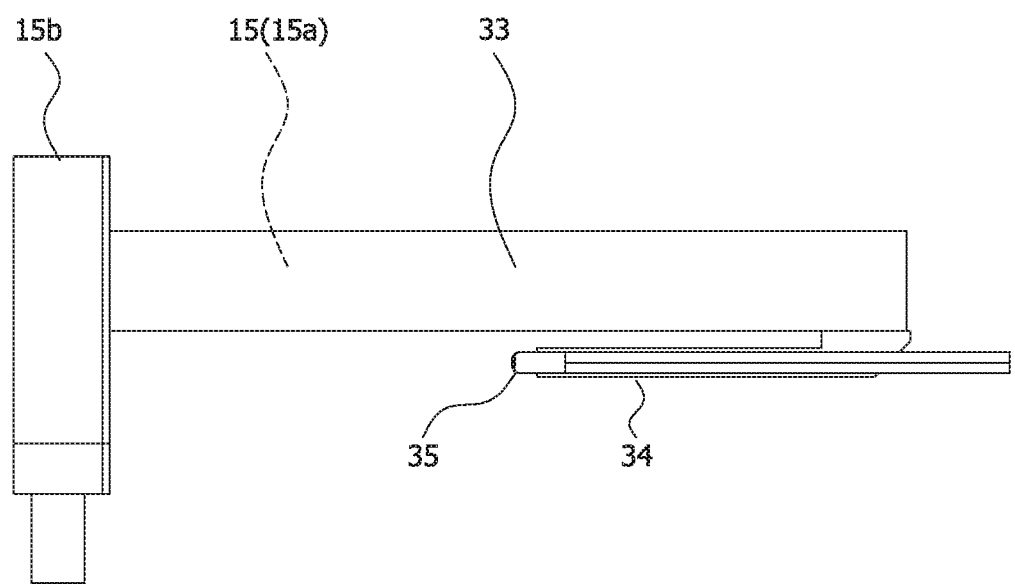
FIG. 11 is a plan view of the frame.

FIGS. 9, 10 and 11 are a perspective view, a front view and a plan view of the frame 33, respectively.

The frame 33 is integrally provided with the one or more temperature sensor holders 34, which facilitate the attachment of the one or more temperature sensors (thermistors) 35.

One of the temperature sensors 35 is used for temperature control of the PTC heater 15. Specifically, the temperature sensor 35 is used to detect the actual temperature of the PTC heater 15 (or air) for controlling the temperature of the PTC heater 15 (or air) at a set temperature.

The same or another one of the temperature sensors 35 is used to protect the housing 2. Specifically, the temperature sensor 35 is used to detect the actual temperature of the housing 2 in order to, when the resin housing 2 is heated to more than a predetermined upper limit temperature, cut off power supply to the PTC heater 15.

The temperature of the PTC heater 15 and the temperature of the housing 2 may be individually detected by separate sensors or their mean temperature value may be detected by a single sensor. Still alternatively, the temperature of each of the PTC heater 15 and the housing 2 may be detected by two or more sensors.

Figure 12:
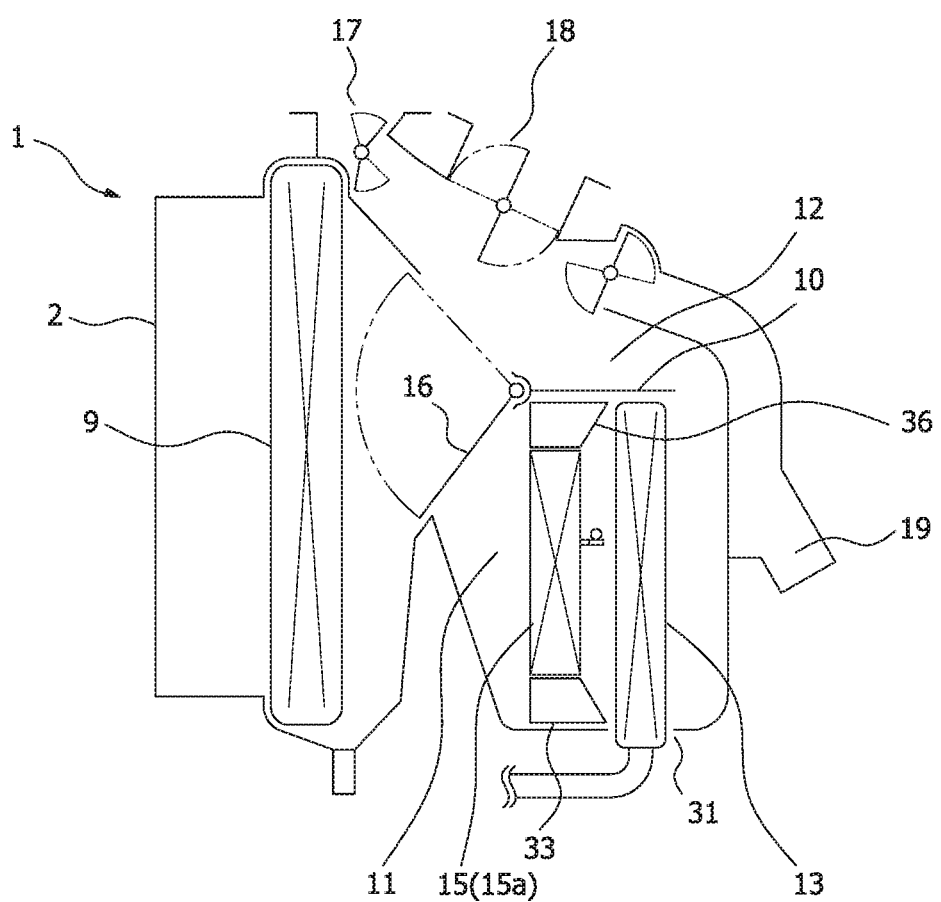
FIG. 12 is a cross-sectional view of an air conditioner of PTC heater type according to another embodiment of the present invention.

FIG. 12 is a cross-sectional view of the HVAC unit 1 of PTC heater type according to another embodiment of the present invention.

In this embodiment, the frame 33 has an inclined guide surface 36 on a portion, to be located closer to the outlet in the air feed passage direction, of the inner surface thereof. The inclined guide surface 36 is formed so that the opening area of the frame 33 increases toward the condenser 13, which is located downstream of the PTC heater 15.

Providing the inclined guide surface 36 as described above can smooth the air flow from the smaller device, the PTC heater 15, to the larger device, the condenser 13.

In this embodiment, the inclined guide surface is provided to the frame on the portion, to be located closer to the outlet in the air feed passage direction, of the inner surface. However, the inclined guide surface may alternatively be provided to the frame on the portion, to be located closer to the inlet in the air feed passage direction, of the inner surface. In this case, the inclined guide surface is formed so that the opening area of the frame 33 decreases toward the heater element 15a.

The illustrated embodiments are intended to merely illustrate examples of the present invention, and it goes without saying that the present invention encompasses various improvements and modifications to be made by those skilled in the art within the scope of the appended claims, in addition to those directly illustrated by the embodiments described above.

REFERENCE SYMBOL LIST

1 HVAC unit
2 Housing

3 Air feed passage
4 Inside-air intake port
5 Outside-air intake port
6 Inside-air/outside-air switching door
7 Filter
8 Blower
9 Evaporator (Air-cooling heat exchanger for heat pump cycle)
10 Partition wall
11 Air-heating heat-exchange passage
12 Bypass passage
13 Condenser (Air-heating heat exchanger for heat pump cycle)
14 Heater core
15 PTC heater
15a Heater element
15b Control unit
16 Air-mix door
17 Defroster air outlet
18 Face air outlet
19 Foot air outlet
29 Heat pump cycle
21 Compressor
22 Decompression means
23 Vehicle-exterior heat exchanger
24 Decompression means
25 Bypass pipe
26 On-off valve
27 Bypass pipe
28 On-off valve
29 Fan
31 and 32 Insertion/ejection slot
33 Frame
34 Temperature sensor holder
35 Temperature sensor
36 Inclined guide surface

The invention claimed is:

1. An automobile air conditioner which includes an air-cooling heat exchanger and two heating devices for air heating that are provided in series in an air feed passage formed in a housing, and in which an upstream heating device of the two heating devices is selected from two types of heating devices differing in shape and size, wherein
the air-cooling heat exchanger is an evaporator for heat pump cycle and is provided upstream of the two heating devices,
the two heating devices are provided in series and adjacent to each other,
the upstream heating device of the two heating devices is mounted in the housing by being inserted thereto through an insertion/ejection slot formed in a side surface of the housing,
a downstream heating device of the two heating devices is mounted in the housing by being inserted thereto through an insertion/ejection slot formed in a lower surface of the housing,
the insertion/ejection slot of the side surface is formed so as to fit the larger one of the two types of heating devices,
when selected, the smaller one of the two types of heating devices is housed in a frame having an external dimension to fit into the insertion/ejection slot of the side surface, and is mounted in the housing with the frame interposed therebetween,
the downstream heating device is larger than the smaller one of the two types of heating devices,
the frame has an inclined guide surface on a portion, to be located closer to an outlet in an air feed passage direction, of an inner surface thereof, the inclined guide surface being formed so that an opening area of the frame increases toward the downstream heating device,
the larger one of the two types of heating devices is a heater core using, as a heating medium, engine cooling water,
the smaller one of the two types of heating devices is an electric heater, and
the downstream heating device is a condenser for heat pump cycle.

2. The automobile air conditioner according to claim 1 wherein the frame has a temperature sensor holder.

3. An automobile air conditioner which includes an air-cooling heat exchanger and two heating devices for air heating that are provided in series in an air feed passage formed in a housing, and in which an upstream heating device of the two heating devices is selected from two types of heating devices differing in shape and size, wherein
the air-cooling heat exchanger is an evaporator for heat pump cycle and is provided upstream of the two heating devices,
the two heating devices are provided in series and adjacent to each other,
the upstream heating device of the two heating devices is mounted in the housing by being inserted thereto through an insertion/ejection slot formed in a side surface of the housing,
a downstream heating device of the two heating devices is mounted in the housing by being inserted thereto through an insertion/ejection slot formed in a lower surface of the housing,
the insertion/ejection slot of the side surface is formed so as to fit the larger one of the two types of heating devices,
when selected, the smaller one of the two types of heating devices is housed in a frame having an external dimension to fit into the insertion/ejection slot of the side surface, and is mounted in the housing with the frame interposed therebetween,
the larger one of the two types of heating devices is a heater core using, as a heating medium, engine cooling water,
the smaller one of the two types of heating devices is an electric heater, and the downstream heating device is a condenser for heat pump cycle.

* * * * *